L. W. BUGBEE.
RETINOSCOPE.
APPLICATION FILED AUG. 7, 1916.
1,211,073.
Patented Jan. 2, 1917.
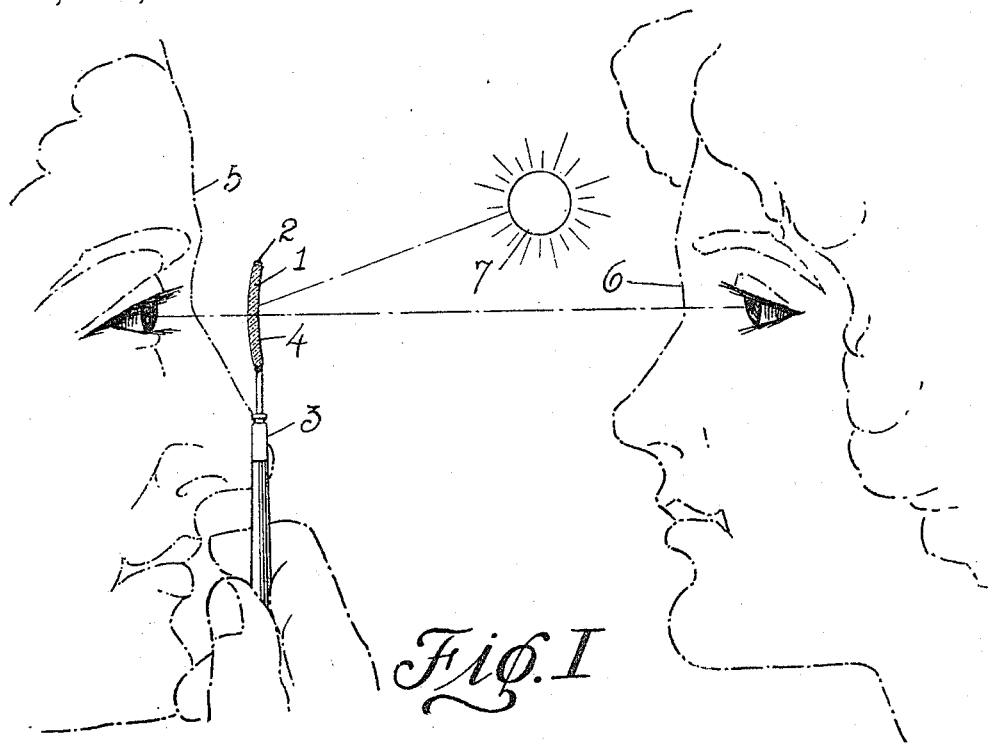
Fig. I
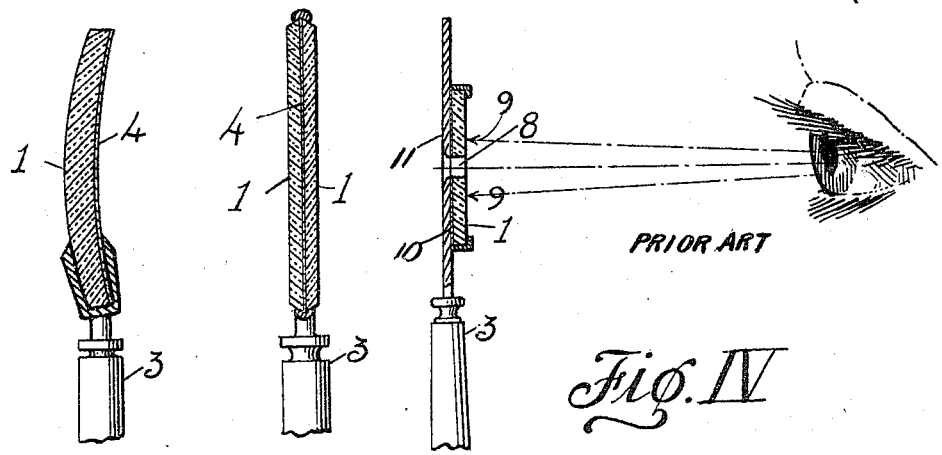
Fig. II   Fig. III   Fig. IV
PRIOR ART
INVENTOR
LUCIAN W. BUGBEE
BY
H. H. Styll & H. H. Parsons
ATTORNEYS

UNITED STATES PATENT OFFICE.

LUCIAN W. BUGBEE, OF SOUTHBRIDGE, MASSACHUSETTS, ASSIGNOR TO AMERICAN OPTICAL COMPANY, OF SOUTHBRIDGE, MASSACHUSETTS, A VOLUNTARY ASSOCIATION OF MASSACHUSETTS.

RETINOSCOPE.

1,211,073. Specification of Letters Patent. Patented Jan. 2, 1917.

Application filed August 7, 1916. Serial No. 113,524.

*To all whom it may concern:*

Be it known that I, LUCIAN W. BUGBEE, a citizen of the United States, residing at Southbridge, in the county of Worcester and State of Massachusetts, have invented certain new and useful Improvements in Retinoscopes, of which the following is a specification.

My invention relates to improvements in eye testing devices and has particular reference to an improved construction of retinoscope or similar device for use in the testing of eyes by the projection of a beam of light onto the eye.

The principal object of the present invention is the provision of a device of this character in which the operator will have a clearer and less obstructed view of the eye of the patient than is possible with present known forms of devices.

A further object of the invention is the provision of a device which will relieve the eyes of both the operator and the patient from a certain amount of strain hitherto present in connection with devices of this character.

Another object of the invention is the provision of an improved construction of device which will absolutely eliminate the so-called false shadow present in the use of present known forms of retinoscopes.

Other objects and advantages of my improved construction should be readily apparent by reference to the following description taken in connection with the accompanying drawings, and it will be understood that I may make any modifications in the specific details of construction shown and described within the scope of the appended claims without departing from or exceeding the spirit of my invention.

Figure I represents a view illustrating the use of my improved retinoscope. Fig. II represents an enlarged sectional view of one form thereof. Fig. III represents a similar view of another construction. Fig. IV represents a view of a prior art form of device.

In the drawings, in which similar characters of reference are employed to denote corresponding parts throughout the several views, the numeral 1 designates the main or glass portion of the retinoscope inclosed by a suitable frame 2 encircling the edge thereof, to which is attached the handle 3 for manipulation of the device.

In Fig. II, I have shown my device as of curved or meniscus form to provide a concave mirror, while in Fig. III, I have shown it as plano, formed to provide an ordinary non-focusing mirror, it being understood that my improvement is equally adaptable to any desired style of mirror.

In the construction of my improved retinoscope I form the glass in a continuous disk and apply to one surface thereof a transparent reflecting coating comprising a metallic or other film 4 sufficiently transparent to permit the operator located at 5 to obtain perfect vision through the retinoscope and clearly see the eye of the patient located at 6, the film or coating at the same time having sufficient reflecting properties in connection with the glass 1 to which it is applied to form a satisfactory mirror reflecting the light as from 7 back onto the eye of the patient for testing in the usual manner.

The advantage of this construction should be at once apparent by reference to Fig. IV, showing the prior art form of construction, in which a solid non-transparent coating 10 is placed on the back of the glass 1, and in which a central peep hole or aperture 8 is provided, through which the operator must peep at the eye of the patient, the reflecting device being ordinarily mounted on a metal or other disk 11 having an aperture coincident with the aperture through the mirror and being absolutely opaque.

This form of device has always been open to considerable objection in that in actual practice but a limited central portion approximately that inclosed by the arrow 9 is really used for throwing the beam of light onto the eye of the patient, while this portion of the retinoscope is broken up as by the aperture 8. The retinoscope loses considerable of its efficiency while at the same time many operators complain of a false shadow in the eye on account of this break in the projecting surface, and consequent break in the beam of light rendering the efficient use of the retinoscope much more difficult.

In addition there is the usual optical objections to vision through a restricted aperture such as the aperture 8, combined with the strain on the eye of the operator, the fact that the light from 7 shines through the aperture direct into the eye of the operator thus also tending to impair or distort his vision. On the other hand, in connection with the present improved device the entire retinoscope being transparent there is no necessity for squinting or peeping as is necessary in previous forms. The operator uses his eye to look direct into the eye of the patient in the usual manner and is, therefore, able to obtain much better results and has a more effective field for reflection of the desired beam of light, and at the same time a very much better vision than is possible with the old forms.

To additionally increase the efficiency of my device I may if desired form the glass portion 1 of Sir William Crookes or other desired glass, having the property of absorption of ultra violet or harmful rays, in which event the film or coating 4 is preferably placed on the rear of the glass, or in other words on the side toward the operator. When this type of glass is employed the glass will absorb the ultra violet portion of the spectrum preventing any harmful rays from being reflected onto the eye of the patient, and more especially absorbing these rays and preventing their reaching the eye of the operator. This may possibly be termed the more essential feature, in that the patient is subjected for but a short time to the reflection of the rays in any event, while the operator, if a busy refractionist, must use the instrument many times a day and each time is subject to the direct light into his eyes from the source of illumination 7 which is liable in the case of ordinary retinoscopes to in time injure his eyesight, a thing prevented by the use of my improved retinoscope, giving him both better vision and at the same time absorbing harmful rays and preventing their reaching his eye.

I claim:

1. A retinoscope, comprising a continuous transparent disk having a transparent reflecting coating applied thereto, whereby the device may be employed to cast a beam of light into the eye of a patient and at the same time permit of uninterrupted inspection of the eye of the patient through the retinoscope by the operator.

2. A retinoscope or the like, comprising a transparent disk having the property of selective absorption of light rays, said disk having applied thereto a transparent reflecting coating whereby light impinging on the disk will be reflected back in the direction of its origin while an operator may have clear vision through the disk and coating in the direction of the projected light.

3. A retinoscope composed of superimposed transparent layers, one of said layers having the property of selective absorption and the other of selective reflection of light rays.

4. A retinoscope comprising superimposed transparent layers, one of said layers having the property of reflection of light rays.

5. A retinoscope comprising superimposed transparent layers, one of said layers having the property of selective absorption of light rays, and the other of said layers having the property of reflection of rays in the visible spectrum.

6. A retinoscope in the form of a continuous unpierced disk transparent to vision and reflective as to light rays impinging thereon.

In testimony whereof I affix my signature in the presence of two witnesses.

LUCIAN W. BUGBEE.

Witnesses:
EDITH M. HALVORSEN,
ESTHER M. LAFLER.